(12) United States Patent
Hyun

(10) Patent No.: US 9,825,503 B2
(45) Date of Patent: Nov. 21, 2017

(54) MOTOR WITH COOLING SYSTEM

(71) Applicant: LG INNOTEK CO., LTD., Seoul (KR)

(72) Inventor: Woo Jin Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 257 days.

(21) Appl. No.: 13/922,612

(22) Filed: Jun. 20, 2013

(65) Prior Publication Data
US 2013/0342046 A1    Dec. 26, 2013

(30) Foreign Application Priority Data
Jun. 22, 2012  (KR) .................. 10-2012-0067335

(51) Int. Cl.
| H02K 9/00 | (2006.01) |
| H02K 9/19 | (2006.01) |
| H02K 5/20 | (2006.01) |

(52) U.S. Cl.
CPC ............... H02K 5/20 (2013.01); H02K 9/19 (2013.01)

(58) Field of Classification Search
CPC ............ H02K 9/19; H02K 5/20; H02K 9/193; H02K 9/00; H02K 5/04; H02K 9/197; H02K 9/20
USPC .................. 310/54, 89, 59, 52, 57, 58, 64
See application file for complete search history.

(56) References Cited

U.S. PATENT DOCUMENTS

| 3,518,466 | A | * | 6/1970 | Bunner ........................... 310/54 |
| 4,111,392 | A | * | 9/1978 | Edelmann ............... F16K 1/523 251/214 |
| 5,220,233 | A | | 6/1993 | Birch et al. |
| 6,072,253 | A | * | 6/2000 | Harpenau et al. .............. 310/58 |
| 6,909,210 | B1 | * | 6/2005 | Bostwick ................. H02K 5/20 310/254.1 |
| 7,322,103 | B2 | | 1/2008 | Burjes et al. |

(Continued)

FOREIGN PATENT DOCUMENTS

| CN | 201226471 Y | 4/2009 |
| CN | 201868993 U | 6/2011 |

(Continued)

OTHER PUBLICATIONS

JP2010213402 Translation.*

(Continued)

*Primary Examiner* — Naishadh Desai
*Assistant Examiner* — Alexander Moraza
(74) *Attorney, Agent, or Firm* — Saliwanchik, Lloyd & Eisenschenk

(57) ABSTRACT

Disclosed is a motor, the motor according to an exemplary embodiment of the present disclosure including a motor unit including a stator, a rotor and a rotation shaft receiving a rotary power from the rotor, a first housing accommodating the motor unit and including a hitching rim protruded thereinto at a distal end of an upper surface, a second housing interposed between the first housing and the motor unit and including a first flange unit protruded to an upper outer surface for a space distanced from the first housing and a second flange protruded to a bottom outer surface, a first cover coupled to an upper surface of the first housing and the second housing, and a second cover coupled to a bottom surface of the first housing and the second housing.

6 Claims, 5 Drawing Sheets

(56) References Cited

U.S. PATENT DOCUMENTS

| | | | |
|---|---|---|---|
| 7,701,095 B2 * | 4/2010 | Gizaw | H02K 5/20 310/52 |
| 2004/0051404 A1 * | 3/2004 | Kurosawa et al. | 310/49 R |
| 2004/0124720 A1 | 7/2004 | Condamin et al. | |
| 2005/0268464 A1 * | 12/2005 | Burjes et al. | 29/890.035 |
| 2006/0255666 A1 * | 11/2006 | Williams | H02K 5/24 310/51 |
| 2008/0304986 A1 * | 12/2008 | Kenyon | A61M 16/0066 417/423.12 |
| 2009/0102298 A1 * | 4/2009 | Savant et al. | 310/52 |
| 2010/0213798 A1 * | 8/2010 | Yuan | G01D 1/00 310/68 B |
| 2012/0080117 A1 * | 4/2012 | Bradfield | 141/1 |
| 2013/0088102 A1 * | 4/2013 | Zook | 310/54 |
| 2013/0169077 A1 * | 7/2013 | Takei | H02K 5/20 310/54 |
| 2013/0259720 A1 * | 10/2013 | Mills | F04D 29/5806 417/410.1 |

FOREIGN PATENT DOCUMENTS

| | | |
|---|---|---|
| CN | 202276225 U | 6/2012 |
| DE | 10141891 A1 | 3/2003 |
| DE | 102010029986 A1 | 12/2011 |
| EP | 1719236 A1 | 11/2006 |
| JP | H01274636 A | 11/1989 |
| JP | 345059 U | 4/1991 |
| JP | H06106447 A | 4/1994 |
| JP | H08205474 A | 8/1996 |
| JP | H0993871 A | 4/1997 |
| JP | H1034645 A | 2/1998 |
| JP | 2009247085 A * | 10/2009 |
| JP | 2010213402 A * | 9/2010 |

OTHER PUBLICATIONS

JP 2009247085 (English Translation).*

Office Action dated Aug. 31, 2016 in Chinese Application No. 201310252746.7.

Office Action dated Jan. 24, 2017 in Japanese Application No. 2013130439.

Extended European Search Report dated Sep. 1, 2017 in European Application No. 13173112.7.

* cited by examiner

MOTOR WITH COOLING SYSTEM

CROSS-REFERENCE TO RELATED APPLICATION

This application claims the benefit under 35 U.S.C. §119 of Korean Application No. 10-2012-0067335, filed Jun. 22, 2012, which is hereby incorporated by reference in its entirety.

BACKGROUND OF THE DISCLOSURE

Field of the Disclosure

The present disclosure relates to a motor configured to be cooled by cooling water.

Discussion of the Related Art

A motor is an apparatus converting an electric energy to a rotary power, and used as a power source for various devices.

In a case a motor generates a rotary power by consuming the electric energy, and a large quantity of heat is generated from the motor, and efficiency of the motor decreases due to the heat generated by the motor. Recently, a high powered motor for vehicles employs a water-cooling water jacket to quickly remove heat generated by a motor.

Although a conventional water jacket employs a pipe inserting type method using a pipe in which refrigerant passes by penetrating an inside of a stator generating a rotary power and generating a large quantity of heat and a housing, the conventional pipe inserting type method suffers from disadvantages in that structure is very complicated, a space inside the motor is very limited by the pipes and cooling efficiency is very low.

BRIEF SUMMARY

The present disclosure is directed to cope with the above-mentioned problems/disadvantages and it is an object of the present disclosure to provide a motor configured to allow refrigerant to pass through an inside of a dually-formed housing, to simplify a structure, to prevent the refrigerant from being leaked from the dually-formed housing, and to enable a mutual coupling of the dually-formed housing by simply improving an assembly structure of a housing.

It is another object of the present disclosure to provide a motor configured to greatly improve a dually-formed housing and a coaxiality of a motor unit inside the dually-formed housing.

Technical problems to be solved by the present disclosure are not restricted to the above-mentioned description, and any other technical problems not mentioned so far will be clearly appreciated from the following description by the skilled in the art.

In one general aspect of the present disclosure, there is provided a motor, the motor comprising: a motor unit including a stator, a rotor and a rotation shaft receiving a rotary power from the rotor; a first housing accommodating the motor unit and including a hitching rim protruded thereinto at a distal end of an upper surface; a second housing interposed between the first housing and the motor unit and including a first flange unit protruded to an upper outer surface for a space distanced from the first housing and a second flange protruded to a bottom outer surface; a first cover coupled to an upper surface of the first housing and the second housing; and a second cover coupled to a bottom surface of the first housing and the second housing.

Preferably, but not necessarily, the motor may further comprise at least one diaphragm unit to divide a space between the first housing and the second housing to at least two spaces.

Preferably, but not necessarily, at least two diaphragm units may be provided, each diaphragm unit being spaced apart at an equal gap.

Preferably, but not necessarily, at least two diaphragm units may be provided, each diaphragm unit being spaced apart at a different gap.

Preferably, but not necessarily, the diaphragm unit may be protruded to a periphery of the second housing in a shape of a rim or a ring.

Preferably, but not necessarily, the at least one diaphragm unit may include at least one through hole or opening.

Preferably, but not necessarily, the motor may further comprise: a first array unit vertically formed at a bottom surface of the first cover to array a centrality of the second housing by pressing the first flange unit to an inner surface of the first housing; and a second array unit vertically formed at a bottom surface of the second cover to array a centrality of the second housing by pressing the second flange unit to an inner surface of the first housing.

Preferably, but not necessarily, the hitching rim may be formed at an upper surface with a first sealing ring receiving groove, and the first sealing ring receiving groove may be formed with a first sealing ring sealing an upper surface of the motor by being closely contacted to the first cover.

Preferably, but not necessarily, the second flange unit may be formed at a bottom surface with a second sealing ring receiving groove, and the second sealing ring receiving groove may be formed with a second sealing ring sealing a bottom surface of the motor by being closely contacted to the second cover.

Preferably, but not necessarily, the first flange unit may be formed at a periphery with a third sealing ring receiving groove, and the third sealing ring receiving groove may be formed with a third sealing ring sealing an upper outer surface of the motor by being closely contacted to the first housing.

Preferably, but not necessarily, the second flange unit may be formed at a periphery with a fourth sealing ring receiving groove, and the fourth sealing ring receiving groove may be formed with a fourth sealing ring sealing a bottom outer surface of the motor by being closely contacted to the first housing.

Preferably, but not necessarily, the first housing may be formed with a refrigerant inlet and a refrigerant outlet to allow refrigerant to be introduced into or to be discharged from a space formed between the first and second housings.

In an advantageous effect, a motor according to an exemplary embodiment of the present disclosure can cool the motor using refrigerant in a simple structure by forming, at an outside of a motor unit generating a large quantity of heat, a dual housing through which the refrigerant passes, can prevent the refrigerant from being leaked using a plurality of sealing rings, and can couple all the dual housing by coupling only one of the dual housing.

DETAILED DESCRIPTION

Figure 1:
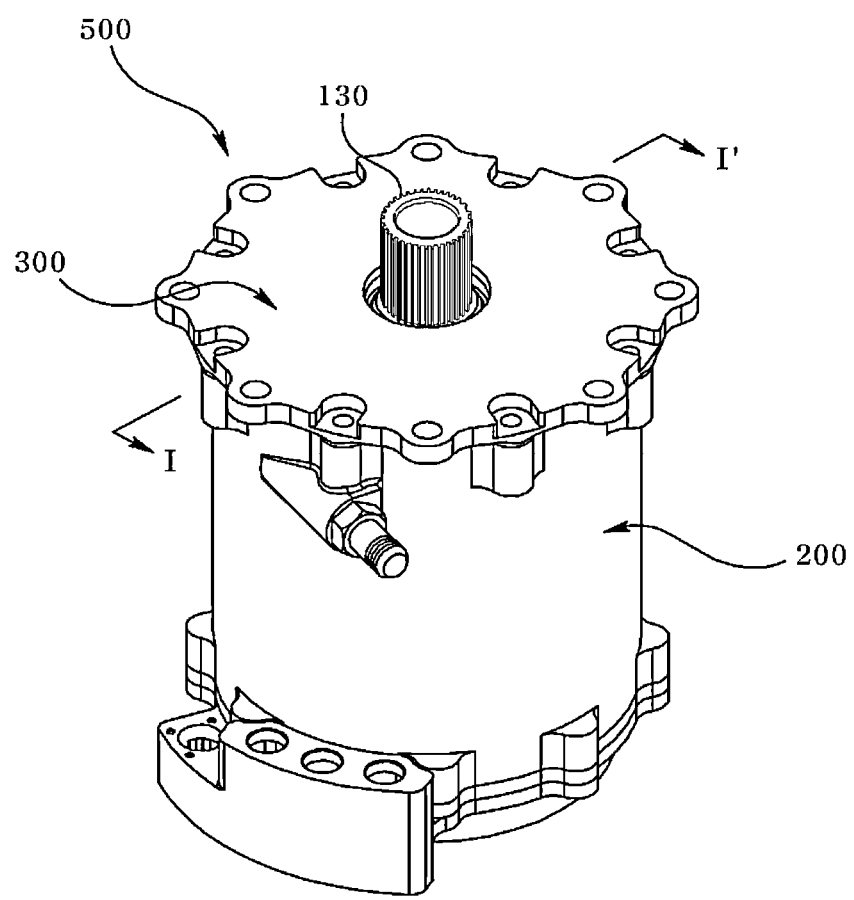
FIG. 1 is a schematic perspective view illustrating a motor according to an exemplary embodiment of the present disclosure.

Now, a motor according to the exemplary embodiment of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. In the drawings, the size and relative sizes of layers, regions and/or other elements may be exaggerated or reduced for clarity. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
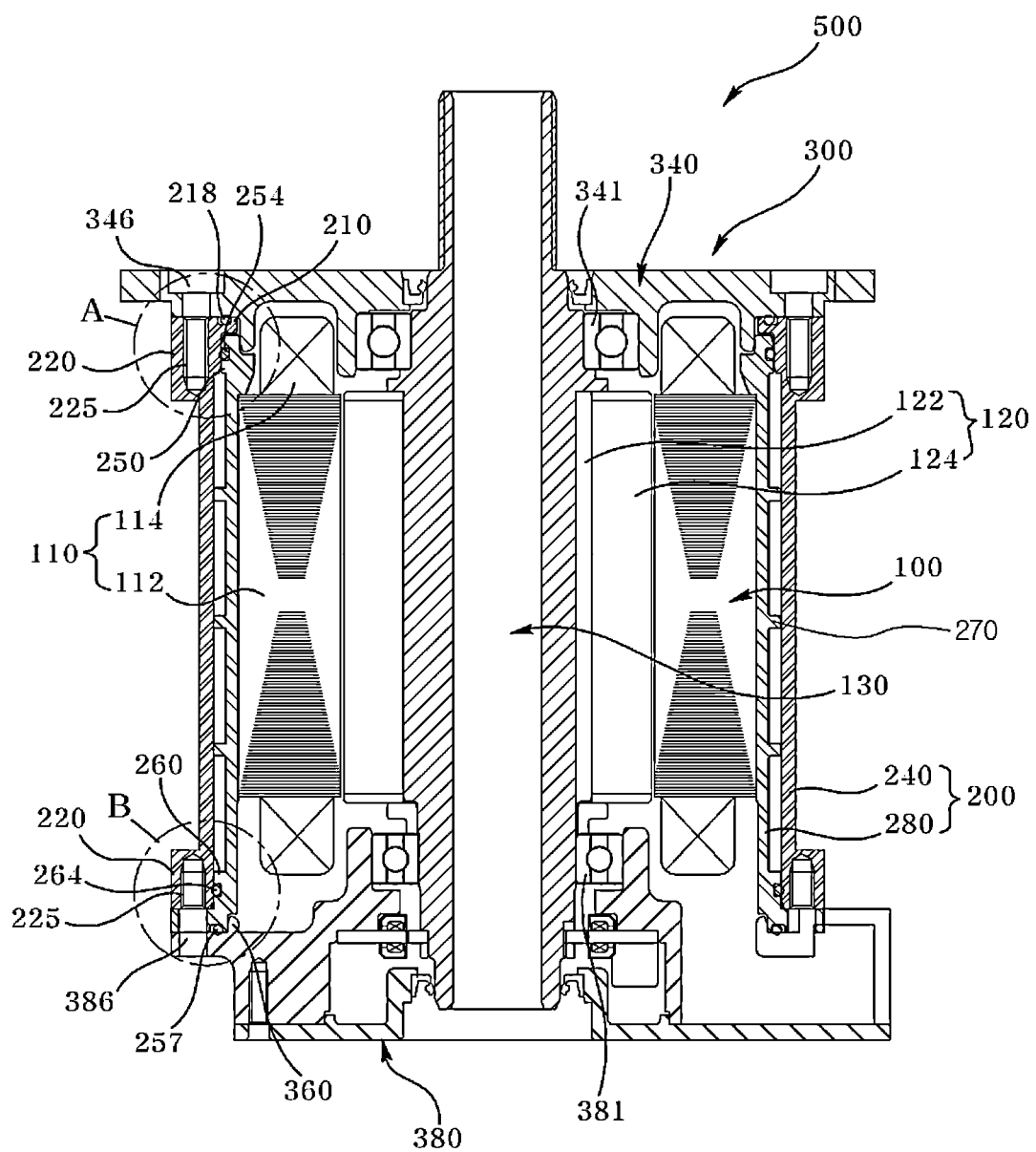
FIG. 2 is a cross-sectional view taken along line I-I' of FIG. 1.
Figure 3:
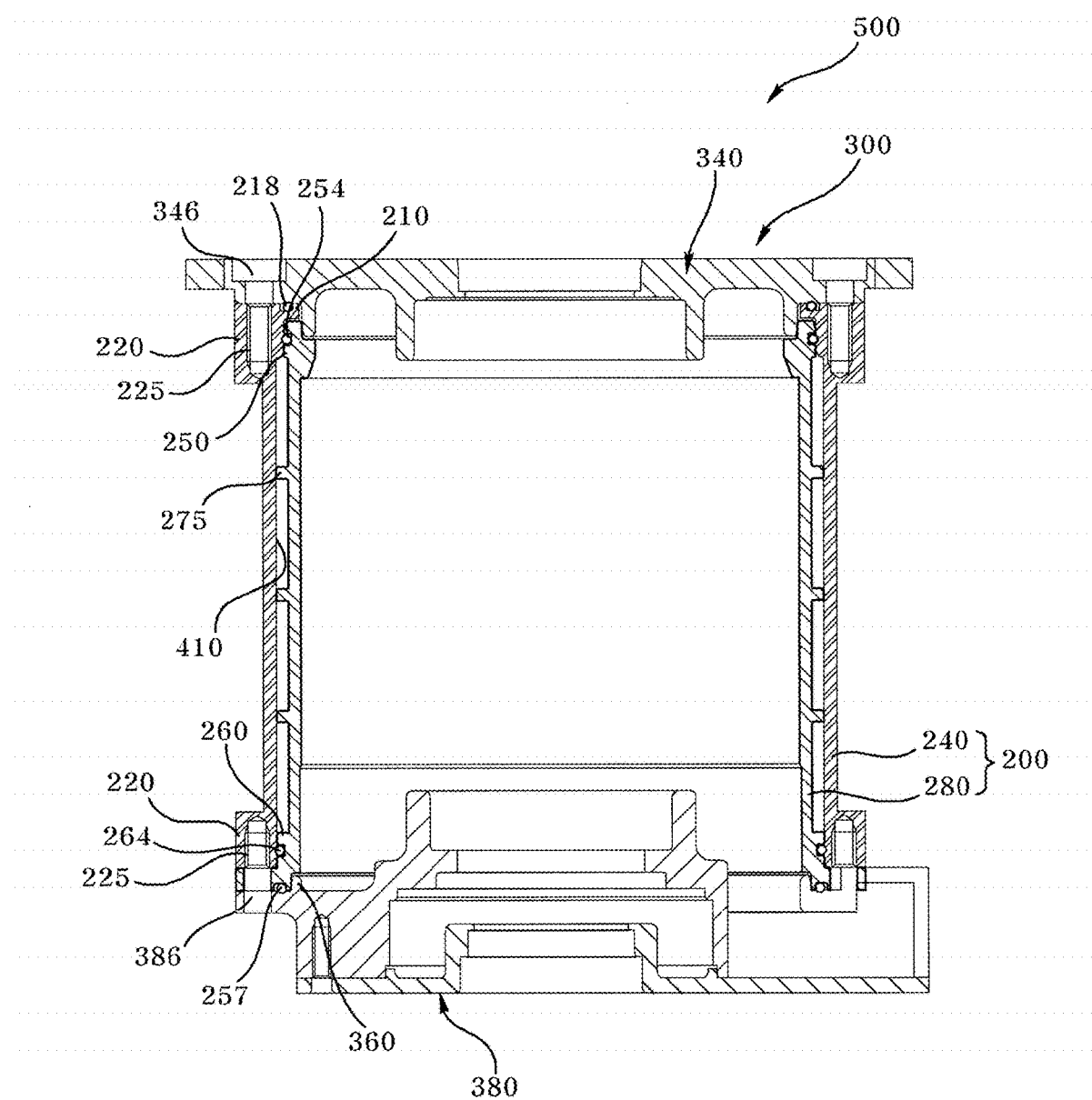
FIG. 3 is an extracted cross-sectional view illustrating a housing and a cover for explaining a coupled relationship between the housing and the cover of FIG. 2.
Figure 4:
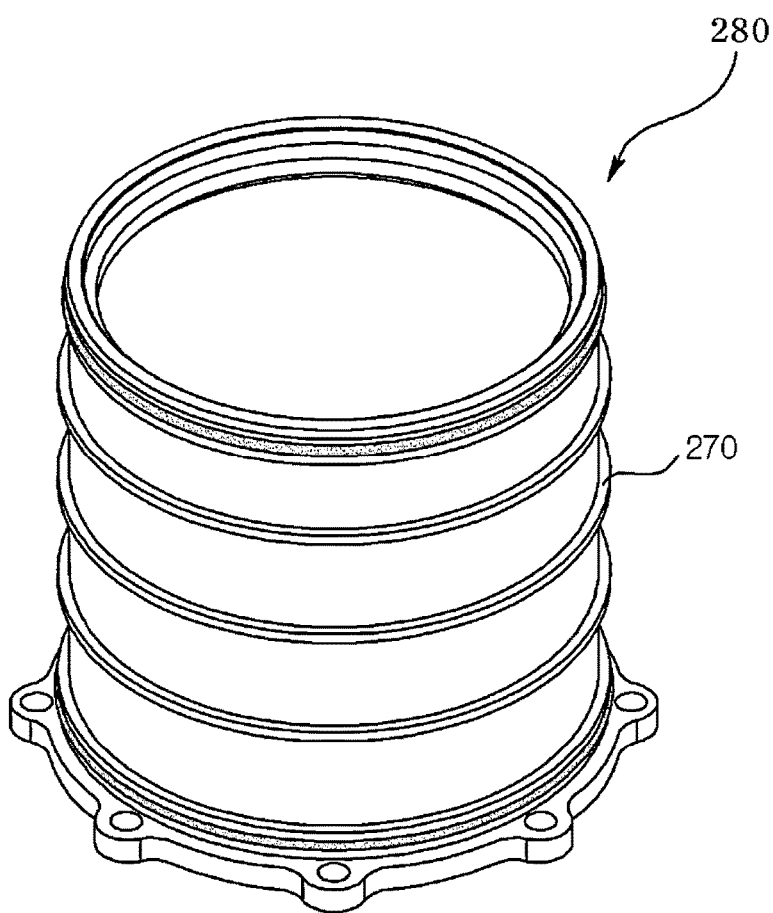
FIG. 4 is a perspective view illustrating an exterior look of a second housing of FIG. 2.
Figure 5:
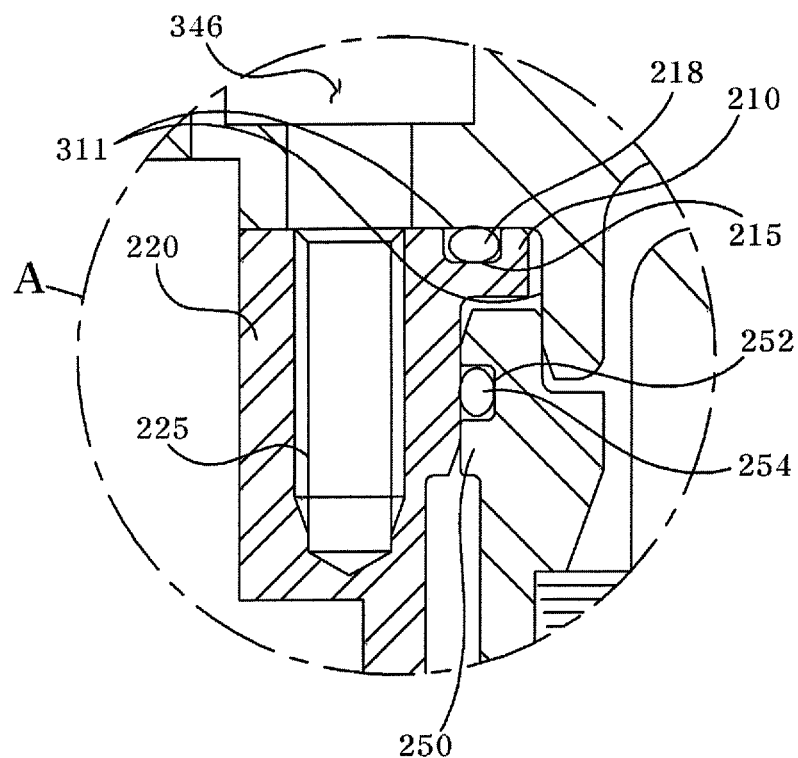
FIG. 5 is a partial enlarged view illustrating an 'A' portion of FIG. 2.
Figure 6:
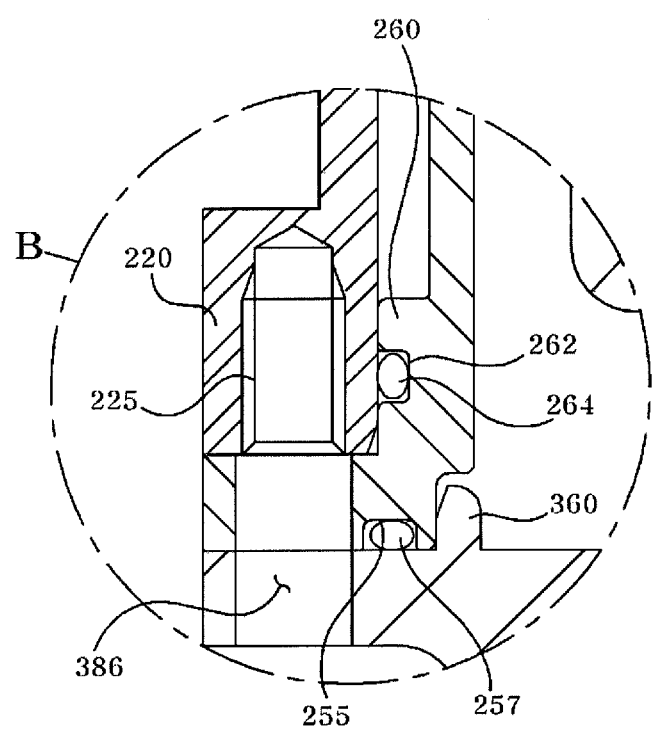
FIG. 6 is a partial enlarged view illustrating a 'B' portion of FIG. 2.

FIG. 1 is a schematic perspective view illustrating a motor according to an exemplary embodiment of the present disclosure, FIG. 2 is a cross-sectional view taken along line I-I' of FIG. 1, FIG. 3 is an extracted cross-sectional view illustrating a housing and a cover for explaining a coupled relationship between the housing and the cover of FIG. 2, FIG. 4 is a perspective view illustrating an exterior look of a second housing of FIG. 2, FIG. 5 is a partial enlarged view illustrating an 'A' portion of FIG. 2, and FIG. 6 is a partial enlarged view illustrating a 'B' portion of FIG. 2.

Referring to FIGS. 1 to 5, a motor (500) according to an exemplary embodiment of the present disclosure largely includes a motor unit (100), a housing (200) and a cover (300).

The motor unit (100) includes a non-rotating stator (110) generating a rotary power by using an electric energy, a rotor (120) rotating relative to the stator (110) and a rotation shaft (130).

The stator (110) takes a shape of a centrally-hollowed cylinder, and includes a stator core (112), and a core (114) wound on the stator core (112). In a case the coil (114) wound on the stator core (112) is applied with a current, an electromagnetic field for rotating the rotor (120) is generated from the coil (114). The rotor (120) is arranged inside the stator (110), and includes a rotor core (122) and a magnet arranged on the rotor core (122). The rotor (120) is rotated relative to the stator (110) by attractive force or repulsive force generated by the magnet (124) and the electromagnetic field generated by the coil (114) of the stator (110).

The rotation shaft (130) is installed by penetrating an upper surface and a bottom surface of the rotor (120), and the rotary force of the rotor (120) is outputted to an outside through the rotation shaft (130).

Now, referring to FIGS. 2, 3 and 5, the housing (200) includes a first housing (240) and a second housing (280) accommodated inside the motor unit (100). The first housing (240) takes a shape of upper/bottom surfaces-opened cylinder, and includes a refrigerant inlet connected to an outer bottom surface of the first housing (240) and a refrigerant outlet arranged at an outer upper surface of the first housing (240), thereby providing a refrigerant flow path (410). The refrigerant inlet and the refrigerant outlet may be changed in position.

The refrigerant inlet functions to provide the refrigerant having a first temperature from an outside of the first housing (240) to an inside of the first housing (240). In the exemplary embodiment of the present disclosure, the refrigerant may include water, and alternatively may include various types of liquids and gases for heat-exchange.

The refrigerant outlet serves to discharge, to the outside of the first housing (240), the refrigerant having a second temperature higher than the first temperature that is a temperature before the refrigerant has been heat-exchanged inside the first housing (240) and introduced into the housing.

A hitching rim (210) is extensively formed at an inner upper surface toward a center of the first housing (240). The hitching rim (210) forms a predetermined space along with a first array unit (described later), and the second housing (280) is fixed inside the space, where the second housing (280) is prevented from being disengaged from the first housing (240).

The hitching rim (210) may take a shape of a continuously protruding rim or a continuously protruding ring along a distal end of an inner surface of the first housing (240). The hitching rim (210) may be formed at an upper surface with a ring-shaped first sealing ring receiving groove (215), and the first sealing ring receiving groove (215) is arranged with a first sealing ring (218), where the first sealing ring (218) is brought into contact with a first cover (described later) to seal an upper surface of the motor (500).

A plurality of protrusions (220) is respectively formed on an upper distal end formed with the hitching rim (210) of the first housing (240) and on an outer bottom surface opposite to the upper distal end, and a female screw unit (225) is formed on each of the protrusions (220).

The second housing (280) is inserted into an inside of the first housing (240), where an inner surface of the first housing (240) is arranged to be opposite to a periphery of the second housing (280). The second housing (280) is arranged at an inside with the motor unit (100). The second housing (280) takes a shape of upper/bottom surfaces-opened cylinder.

The second housing (280) is formed with a distal end of one side fixed by a space formed by the hitching rim (210) and a first array unit (310, described later), and a distal end of the other side opposite to the distal end of one side is formed with a second sealing ring receiving groove (255). The second sealing ring receiving groove (255) is formed with a second sealing ring (257), where the second sealing ring (257) is brought into contact with a second cover (described later) to seal a bottom surface of the motor (500).

Meanwhile, a first flange unit (250) is formed at an upper outer surface of the second housing (280), and a second flange unit (260) is formed at a bottom outer surface of the second housing (280) opposite to the upper outer surface of the second housing (280).

The first flange unit (250) may take a shape of a continuous rim or a continuous ring along an upper surface of a periphery of the housing (280), and the second flange unit (260) may take a shape of a continuous rim or a continuous ring along a bottom surface of the periphery of the second housing (280).

A third sealing ring receiving groove (252) is formed at a portion opposite to an inner surface of the first housing (240)

of the first flange unit (250), and the third sealing ring receiving groove (252) is formed with a third sealing ring (254), where the third sealing ring (254) is brought into close contact with an inner surface of the first housing (240) to seal an upper surface of the motor (500).

A fourth sealing ring receiving groove (262) is formed at a portion opposite to an inner surface of the first housing (240) of the second flange unit (260), and the fourth sealing ring receiving groove (262) is formed with a fourth sealing ring (264), where the fourth sealing ring (264) is brought into close contact with an inner surface of the first housing (240) to seal a bottom lateral surface of the motor (500).

Meanwhile, at least one diaphragm unit (270) is formed at a position opposite to a position between the first and second flange units (250, 260) on the periphery of the second housing (280). The diaphragm unit (270)

The diaphragm unit (270) may take a shape of a protruding rim or a protruding ring along the periphery of the second housing (240), and a free distal end of the diaphragm unit (270) is brought into close contact with an inner surface of the first housing (240). A space formed between the first and second housings (240, 280) as the at least one diaphragm (270) is brought into close contact with the inner surface of the first housing (240) may be divided to a plurality of spaces in response to the number of diaphragm units (270). The diaphragm unit (270) is formed with a communication unit (275) mutually communicating adjacent spaces formed by the diaphragm units (270).

The communication unit (275) may be formed by cutting a part of the diaphragm (270) or by forming a through hole on the diaphragm unit (270), where at least one communication unit (275) may be formed on each of the diaphragm unit (270). The refrigerant provided to the refrigerant inlet by the communication unit (275) is discharged through the refrigerant outlet after passing through the diaphragm (270).

The communication unit (275) formed on the diaphragm unit (270) allows the refrigerant provided to the refrigerant inlet to be fully heat-exchanged and discharged through the refrigerant outlet. The number of communication units (275) may be changed according to heat-exchanging characteristics of the refrigerant. Although the exemplary embodiment of the present disclosure has described and explained the diaphragm unit (270) formed on the periphery of the second housing (280), the diaphragm unit (270) may be formed at an inner surface of the first housing (240).

Furthermore, although the exemplary embodiment of the present disclosure has described and explained the diaphragm unit (270) formed on the periphery of the second housing (280), the diaphragm unit (270) may be formed in an engraved style at a remaining surface except for the surface formed with the diaphragm unit (270) of an inner surface of the second housing (280).

Meanwhile, in a case a plurality of diaphragm units is formed at the periphery of the second housing (280), the diaphragm units (270) may be formed at the periphery of the second housing (280) each at a mutually predetermined equal gap. Alternatively, the gap of the diaphragm units (270) may be narrowly or broadly formed at a position where heat generation is particularly severe in the periphery of the second housing (280) in order to improve a cooling effect.

Now, referring to FIGS. 2, 3, 5 and 6, the cover (300) includes a first cover (340) and a second cover (380).

The first cover (340) is coupled to the opened upper surface of the first and second housings (240, 280). The first cover (340) is formed in a shape of a disc to be coupled to an upper surface of the housing (200), and centrally formed with a through hole through which the rotation shaft (130) passes. A bearing (341) coupled to an upper surface of a periphery of the rotation shaft (130) is formed about the through hole.

A bottom surface of the first cover (340) opposite to the upper surface of the housing (200) presses the hitching rim (210) of the first housing (240) from an upper surface to a bottom surface to be brought into contact with the first sealing ring (218) formed at an outside of the hitching rim (210) and to seal an upper surface of the motor (500). The first cover (340) is formed at the bottom surface with a first array unit (310) protruded to a vertical direction in order to arrange a center of the second housing (280) to a center of the first cover (340) by being contacted to an inner surface of the second housing (280). Thus, the hitching rim (210) and the first cover (340) form two boundaries (311).

The first array unit (310) is protruded in a circular fence shape from the bottom surface of the first cover (340), and the first array unit (310) is brought into close contact with the inner surface of the second housing (280).

The first cover (340) includes a through hole (346) formed at a position corresponding to the female screw unit (225) of the protrusion (220) formed at an upper periphery of the first housing (240). A coupling screw (not shown) is coupled to the female screw unit (225) of the protrusion (220) formed at the periphery of the first housing (240) through the though hole (346) of the first cover (340).

In a case the coupling screw couples the first cover (340) and the first housing (240), the second housing (280) can be coupled to the first cover (340) by the first array unit (310) without a separate coupling process. The second cover (380) is coupled to the bottom surface of the first and second housings (240, 280) of the housing (200).

The second cover (380) is formed in a shape of a disc to be coupled to the housing (200), and centrally formed with a through hole through which the rotation shaft (130) passes. A bearing (381) coupled to a bottom periphery of the rotation shaft (130) is formed about the through hole of the second cover (380).

An upper surface of the second cover (380) opposite to the housing (200) presses a distal end of the second housing (280) from a bottom surface to an upper surface, and the bottom surface of the second cover (38) is brought into contact with the second sealing ring (264) formed at the distal end of the second housing (280) to seal a bottom surface of the motor (500).

A second array unit (360) vertically protruded from an upper surface of the second cover (380) in order to arrange a center of the second housing (280) to a center of the second cover (380) by being contacted to an inner surface of the second housing (280).

The second array unit (360) is protruded in a circular fence shape from the bottom surface of the second cover (380), and a periphery of the second array unit (380) is brought into close contact with the inner surface of the second housing (280).

The second cover (380) includes a through hole (386) formed at a position corresponding to the female screw unit (225) of the protrusion (220) formed at a bottom periphery of the first housing (240). A coupling screw (not shown) is coupled to the female screw unit (225) of the protrusion (220) formed at the periphery of the first housing (240) through the though hole (386) of the second cover (380).

In a case the coupling screw couples the second cover (340) and the first housing (240), the second housing (280) can be coupled to the second cover (380) by the second array unit (360) without a separate coupling process.

The motor according to the exemplary embodiment of the present disclosure has an advantageous effect in that assembly of motor is enabled while the coaxiality of the motor unit (100), the first housing (240) and the second housing (280) is accurately maintained by the first array unit (310) and the second array unit (360).

As apparent from the foregoing, the motor according to the exemplary embodiment of the present disclosure can cool the motor using refrigerant in a simple structure by forming, at an outside of a motor unit generating a large quantity of heat, a dual housing through which the refrigerant passes, can prevent the refrigerant from being leaked using a plurality of sealing rings, and can couple all the dual housing by coupling only one of the dual housing.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor, the motor comprising:
a motor unit including a stator, a rotor and a rotation shaft receiving a rotary power from the rotor;
a first housing accommodating the motor unit and including a hitching rim protruded thereinto at a distal end of an upper surface;
a second housing interposed between the first housing and the motor unit and including a first flange unit protruded to an upper outer surface for a space distanced from the first housing and a second flange unit protruded to a bottom outer surface;
a first cover coupled to an upper surface of the first housing and the second housing;
a second cover coupled to and facing a bottom surface of the first housing and the second housing;
a first array unit vertically protruded from a bottom surface of the first cover to array a centrality of the second housing by pressing an inner surface of the first flange unit to an inner surface of the first housing;
a second array unit vertically formed at a bottom surface of the second cover to array a centrality of the second housing by pressing an inner surface of the second flange unit to an inner surface of the first housing;
at least one diaphragm unit to divide a space between the first housing and the second housing to at least two spaces; and
a refrigerant flow path formed at a position between the first flange unit and the second flange unit;
wherein the at least one diaphragm unit is formed at a position between the first and second flange units on a periphery of the second housing and is disposed parallel to each of the first and second flange units;
wherein the hitching rim and the first cover form two boundaries of a predetermined space;
wherein the second housing is fixed inside the predetermined space and in direct physical contact with the first cover;
wherein the hitching rim is formed at an upper surface with a first sealing ring receiving groove, and the first sealing ring receiving groove is formed with a first sealing ring sealing an upper surface of the motor by being closely contacted to a bottom surface of the first cover;
wherein the second flange unit is formed at a bottom surface thereof with a second sealing ring receiving groove, and the second sealing ring receiving groove is formed with a second sealing ring sealing a bottom surface of the motor by directly contacting an upper surface of the second cover;
wherein a bottom surface of the first cover opposite to the upper surface of the first housing presses the hitching rim of the first housing from an upper surface to a bottom surface to be brought into contact with the first sealing ring formed at an outside of the hitching rim and to seal an upper surface of the motor;
wherein the first flange unit is formed at a periphery with a third sealing ring receiving groove, and the third sealing ring receiving groove is formed with a third sealing ring sealing an upper outer surface of the motor by directly contacting an inner surface of the first housing;
wherein the second flange unit is formed at a periphery with a fourth sealing ring receiving groove, and the fourth sealing ring receiving groove is formed with a fourth sealing ring sealing a bottom outer surface of the motor by directly contacting the inner surface of the first housing; and
wherein the first flange unit is interposed between the hitching rim and the first array unit.

2. The motor of claim 1, wherein at least two diaphragm units are provided, each diaphragm unit being spaced apart at an equal gap.

3. The motor of claim 1, wherein at least two diaphragm units are provided, each diaphragm unit being spaced apart at a different gap.

4. The motor of claim 1, wherein the diaphragm unit is protruded to the periphery of the second housing in a shape of a rim or a ring.

5. The motor of claim 1, wherein the at least one diaphragm unit includes at least one through hole or opening.

6. The motor of claim 1, wherein the first housing is formed with a refrigerant inlet and a refrigerant outlet to allow refrigerant to be introduced into or to be discharged from the space formed between the first and second housings.

* * * * *